(12) United States Patent
Moon et al.

(10) Patent No.: US 9,342,750 B2
(45) Date of Patent: May 17, 2016

(54) METHOD AND APPARATUS FOR DETECTING LINE DATA BASED ON HOUGH TRANSFORM

(71) Applicant: Kyungpook National University Industry-Academic Cooperation Foundation, Daegu (KR)

(72) Inventors: Byungin Moon, Daegu (KR); Jeong Rok Lee, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 21 days.

(21) Appl. No.: 14/104,864

(22) Filed: Dec. 12, 2013

(65) Prior Publication Data

US 2015/0125079 A1 May 7, 2015

(30) Foreign Application Priority Data

Nov. 1, 2013 (KR) .................. 10-2013-0131953

(51) Int. Cl.
*G06K 9/00* (2006.01)
*G06K 9/46* (2006.01)

(52) U.S. Cl.
CPC ................................ *G06K 9/4633* (2013.01)

(58) Field of Classification Search
None
See application file for complete search history.

(56) References Cited

U.S. PATENT DOCUMENTS

| 2002/0084330 A1* | 7/2002 | Chiu | 235/462.11 |
| 2012/0105578 A1* | 5/2012 | Ohmiya et al. | 348/36 |
| 2013/0011057 A1* | 1/2013 | Li et al. | 382/165 |

OTHER PUBLICATIONS

Chen, Z. H., et al., "Resource-efficient FPGA architecture and implementations of hough transform," IEEE Tr. VLSI Systems, vol. 20, No. 8, pp. 1419-1428, Aug. 2012.

* cited by examiner

*Primary Examiner* — Hadi Akhavannik
(74) *Attorney, Agent, or Firm* — Blakely Sokoloff Taylor & Zafman LLP

(57) ABSTRACT

A method and an apparatus for detecting straight line information by Hough transform are provided, in which voting computation according to Hough transform is performed only with respect to certain pixels, while the votes of the rest pixels are calculated using the votes of the neighborhood pixels, thereby reducing overhead of voting computation and also increasing hourly throughput.

16 Claims, 2 Drawing Sheets

METHOD AND APPARATUS FOR DETECTING LINE DATA BASED ON HOUGH TRANSFORM

BACKGROUND OF THE INVENTION

1. Field of the Invention

The present invention relates to a method and an apparatus for detecting straight line information with the Hough transform, which are capable of reducing overhead of voting computation and also increasing hourly throughput, by selectively performing voting computation according to the Hough transform only with respect to certain pixels, and calculating votes of the rest pixels using the votes of the neighborhood pixels.

2. Description of the Prior Art

FIG. 1 illustrates a process of mapping respective pixels present in (x, y) coordinate space of an image into (r, θ) coordinate space according to the conventional Hough transform scheme.

Referring to FIG. 1, the respective pixels present in the (x,y) coordinate space of the image are mapped into (r,θ) coordinate space referred to as Hough space, and straight line information is detected based on (r,θ) of the intercepts with frequency above a threshold.

To be specific, the respective pixels in the (x,y) coordinate space of the image as illustrated in FIG. 1 are mapped into curves in the (r,θ) coordinate space, while the pixels present on the same straight line in the (x,y) coordinate space have the intercepts in the (r,θ) coordinate space. Accordingly, through the Hough transform as the one illustrated in FIG. 1, the accumulated frequencies of a specific (r,θ) coordinate space can be viewed as the number of pixels present on the same straight line, and (r,θ) values at the intercepts with frequencies above threshold can be defined as the straight line components. The (r,θ) value computed according to Mathematical Expression 1 below can be defined to be the votes, and the process of accumulating the frequencies of the computed votes in the two-dimensional (2D) alignment in the (r,θ) coordinate space is referred to as the 'voting'.

$$x \cdot \cos\theta + y \cdot \sin\theta = r \quad \text{[Mathematical Expression 1]}$$

The voting process involves standardization of 2D alignment θ and obtaining corresponding votes. The voting process thus computes corresponding votes per unit Δθ according to the resolution of the θ standardization, and repeats the process by θ/Δθ=n total. That is, when K is the total number of input pixels to detect straight line components, the time complexity to perform voting process of the Hough transform is expressed as O(Kn). The overhead of Mathematical Expression 1 has a relatively higher time complexity (O(Kn)), which in turn greatly affects the system performance. Accordingly, it is necessary to provide ways to reduce the overhead of Mathematical Expression 1 to meet real time performance requirement for the Hough transform.

SUMMARY OF THE INVENTION

The present invention has been made to overcome the problems occurring in the prior art, and accordingly, it is an object of the present invention to provide an apparatus and a method for detecting straight line information, which are capable of optimizing an amount of resource use by reducing overhead of the voting computation and increasing recyclability of a vote computation apparatus, and increasing hourly throughput by computing votes of the pixels in parallel manner and storing the same.

In one embodiment, a method for detecting straight line information is provided, which may include inputting an image with extracted edge (step A), designating pixels of the image into block-wise units each comprising a predetermined number of pixels (step B), calculating votes of representative pixels per designated block (step C), calculating votes of rest pixels per block, using the votes of the representative pixels per block (step D), counting accumulated frequencies per vote, using the votes calculated at steps (C) and (D) (step E), and detecting straight line information based on the accumulated frequency information that exceeds a threshold (step F).

The step (B) designates (N) number of pixels in a horizontal or vertical direction into one block-wise unit, according to Hough transform angle (θ).

The step (B) designates (N) number of pixels into one block-wise unit, when the Hough transform angle (θ) is 0<θ<π/4, 3π/4<θ<π, or designates (N) number of pixels in vertical direction as one block-wise unit, when the Hough transform angle (θ) is π/4<θ<3π/4.

The step (C) calculates the votes of the representative pixels per block by adding a predetermined value to the votes of the representative pixels per neighborhood block.

When the Hough transform angle (θ) is 0<θ<π/4, 3π/4<θ<π, the predetermined value is N with respect to neighborhood representative pixels in horizontal direction to the representative pixels, or the predetermined value is tan θ with respect to the neighborhood representative pixels in vertical direction, or when the Hough transform angle (θ) is π/4<θ<3π/4, the predetermined value is cotθ with respect to neighborhood representative pixels in horizontal direction to the representative pixels, or the predetermined value is N with respect to neighborhood representative pixels in vertical direction.

The step (D) calculates votes of the rest pixels per block by adding a predetermined value to the votes of the representative pixels per block.

The representative pixels are M pixels distanced away from the rest pixels, the predetermined value is M.

In one embodiment, an apparatus for detecting straight line information is provided, which may include an edge extractor configured to extract edge information from an incoming image, a pixel block constructor configured to designate pixels of the image received from the edge extractor into block-wise units each comprising a predetermined number of pixels, a vote calculator configured to calculate votes of representative pixels per block as designated by the pixel block constructor and calculate votes of rest pixels per block using the votes of representative pixels per block, and a straight line information detector configured to calculate accumulated frequencies per vote by using the votes calculated at the vote calculator and detect straight line information based on the accumulated frequency information that exceeds a threshold.

The apparatus may additionally include a controller configured to control so that the blocks designated at the pixel block constructor are (N) number of pixel blocks in horizontal or vertical direction, depending on Hough transform angle (θ).

The controller may control the pixel block constructor to designate (N) number of pixels into one block-wise unit, when the Hough transform angle (θ) is 0<θ<π/4, 3π/4<θ<π, or to designate (N) number of pixels in vertical direction as one block-wise unit, when the Hough transform angle (θ) is π/4<θ<3π/4.

The vote calculator calculates the votes of the representative pixels per block by adding a predetermined value to the votes of the representative pixels per neighborhood block.

When the Hough transform angle (θ) is 0<θ<π/4, 3π/4<θ<π, the predetermined value is N with respect to neighborhood representative pixels in horizontal direction to the representative pixels, or the predetermined value is tan θ with respect to the neighborhood representative pixels in vertical direction, or when the Hough transform angle (θ) is π/4<θ<3π/4, the predetermined value is cot θ with respect to neighborhood representative pixels in horizontal direction to the representative pixels, or the predetermined value is N with respect to neighborhood representative pixels in vertical direction.

The vote calculator calculates votes of the rest pixels per block by adding a predetermined value to the votes of the representative pixels per block.

When the representative pixels are M pixels distanced away from the rest pixels, the vote calculator applies M as the predetermined value.

DESCRIPTION OF THE PREFERRED EMBODIMENT

Figure 1:
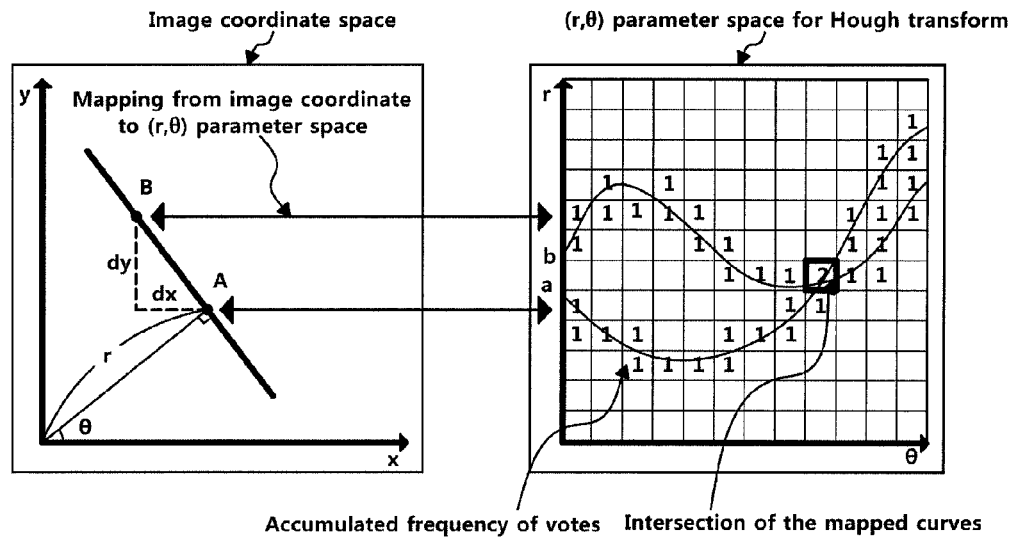
FIG. 1 illustrates a process of mapping respective pixels present in (x,y) coordinate space of an image into (r,θ) coordinate space according to conventional Hough transform.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

The expression such as 'first' or 'second' may be used to describe a variety of constituent elements, but should not be construed as limiting the referred elements. The expressions are used only for the purpose of distinguishing one element from the other.

Throughout the description, the expressions are used to describe specific embodiments, and not to be construed as limiting the invention. A singular form, unless specifically indicated otherwise in its context, encompasses a plural expression. The expression such as 'comprise' or 'include' as used herein is so used as to designate existence of certain characteristics, figures, steps, operations, elements, components, or a combination thereof as indicated in the description, and not to be construed as limiting existence of one or more characteristics, figures, steps, operations, elements, components, or a combination thereof which are other than those indicated herein.

The spatially-relative terms such as 'below', 'beneath', 'lower', 'above', 'upper' may be used to easily describe correlational relationship between one certain device or constituent element with another device or constituent element. The spatially-relative terms will be understood as encompassing not only the direction as indicated in the drawing(s), but also other different directions that may be implemented in actual use or operation. For example, when the device illustrated in the drawing is reverted, the device that was used to be 'below' or 'beneath' another device may be now 'above' or upper' the another device. Accordingly, exemplary terms may be understood as encompassing all the upward and downward directions. The device may be oriented to other directions, according to which the spatially-relative terms may be interpreted depending on the orientations.

Figure 2:
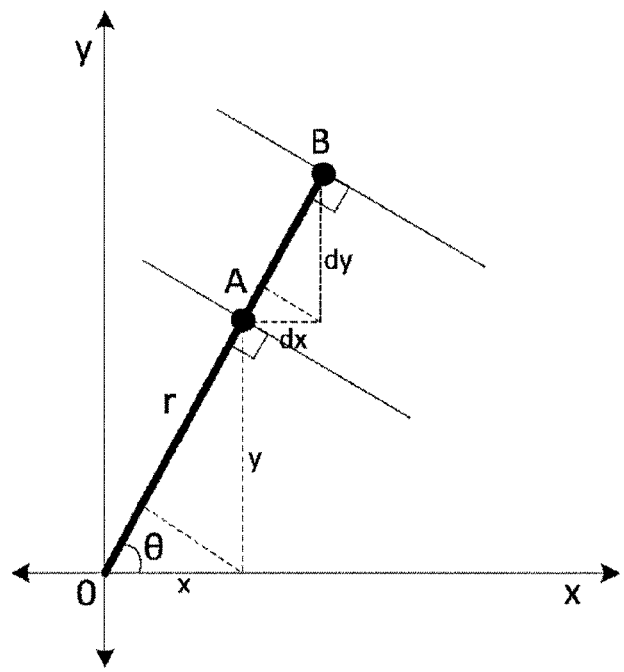
FIG. 2 illustrates two adjacent pixels and correlativity therebetween.

FIG. 2 illustrates two adjacent pixels and correlative relationship therebetween.

Referring to FIG. 2, when coordinates of pixel A is (x, y) in the (x,y) coordinate space, the coordinates of pixel B are (x+dx, y+dy). When the vote of mapping pixel A into (r,θ) coordinate space is A(x,y), the vote of mapping pixel B into (r,θ) coordinate space, i.e., B(x+dx, y+dy), can be expressed according to Mathematical Expression 1 as follows:

$$B(x+dx,y+dy)=A(x,y)+dx\cdot\cos\theta+dy\cdot\sin\theta \quad \text{[Mathematical Expression 2]}$$

Further, since the aim of the voting computation for the purpose of Hough transform is to compare simple sizes of the respective votes and measure frequencies, the frequencies of the respective votes can be identically accumulated even when the two sides of Mathematical Expression 2 are divided by cos θ. Accordingly, the resultant values of the voting are identical. Therefore, Mathematical Expression 2 may be expressed by:

$$B'(x+dx,y+dy)=A'(x,y)+dx+dy\cdot\tan\theta \quad \text{[Mathematical Expression 3]}$$

When dx, dy are predictable, simple addition is enough to obtain B'(x+dx, y+dy) from the votes of the adjacent pixels. Further, compared to the fact that all the terms dx, dy of Mathematical Expression 2 have fraction bit, the term dx of Mathematical Expression 3 has integer '1'. Therefore, computing votes with respect to continuous pixel inputs to x axis direction where dy becomes 0, becomes simplified. One shortcoming is that, with respect to a range of $$\frac{\pi}{4} < \theta < \frac{3\pi}{4},$$

tan θ has increasing θ unlike sin θ and cos θ, so that the function value thereof increases exponentially. As a result, use of hardware resource can increase greatly in hardware implementation. To deal with the above shortcoming, the symmetrical relationship of increment of tan θ and cot θ can be utilized, by using Mathematical Expression 4 below which is to divide both sides of Mathematical Expression 2 by sin θ when computing votes of Δθ in the range of $$\frac{\pi}{4} < \theta < \frac{3\pi}{4}$$

where the overhead of tan θ increases.

$$B''(x+dx,y+dy)=A''(x,y)+dx\cdot\cot\theta+dy \quad \text{[Mathematical Expression 4]}$$

Compared to the fact that all the terms dx, dy of Mathematical Expression 2 have fraction unit, the term dx of Mathematical Expression 4 has integer '1'. Therefore, computing votes with respect to continuous pixel inputs to y axis direction where dx becomes 0, becomes simplified.

Accordingly, the present invention proposes a method and an apparatus for detecting straight lines, which are capable of minimizing computational works of voting operation of the Hough transform, without influencing accuracy of the straight line detection, using Mathematical Expressions 3 and 4. The method and apparatus for detecting straight lines according to the present invention will be explained below with reference to FIGS. 3 and 4.

Figure 3:
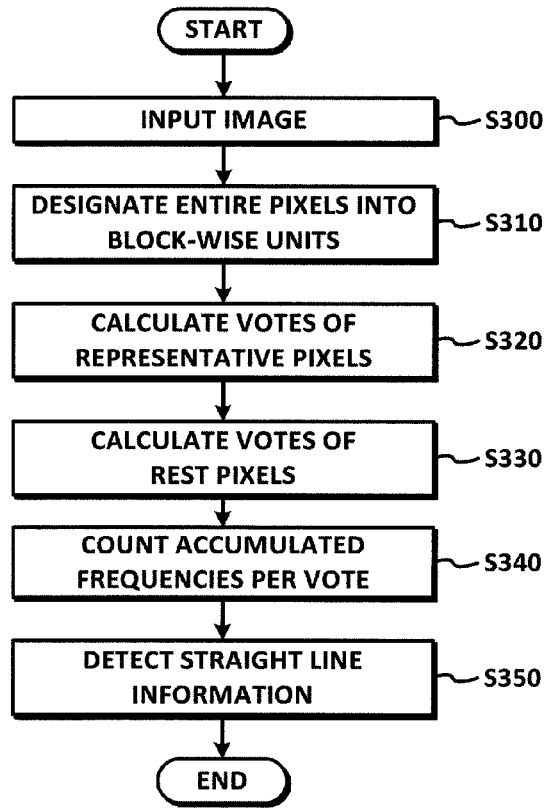
FIG. 3 is a flowchart provided to explain a method for detecting straight line according to an embodiment.

FIG. 3 is a flowchart provided to explain a method for detecting straight lines according to an embodiment.

Referring to FIG. 3, at S300, an image with detected edge information is inputted. The edge information may be detected by applying algorithm to detect edge (or contour line) of an original image. A variety of detect algorithms may be implemented as the edge detection algorithm. For example, variation of brightness value with differential operator, or differential value using partial differential equation, or a method for utilizing mask operation such as Sobel or Prewitt may be applied, although not limited thereto. In another embodiments, a variety of algorithms may be applied to detect the edge information. I none embodiment, the method for detecting straight lines may involve detecting straight line information from the image with detected edges, and through a variety of methods, the image with the detected edge information may be applied.

At S310, the entire pixels of the image are designated into block-wise unit. The 'block-wise unit' as used herein refers to a constitution that includes a plurality of pixels.

In one applicable embodiment, the 'block-wise unit' may include (N) number of pixels. The block-wise unit may be sized to 1*N or N*1.

In one desirable embodiment, the block-wise unit may be applied differently in the Hough transform, depending on angle (θ). To be specific, depending on the size of Hough transform angle (θ), one block-wise unit may be composed of (N) number of pixels in transversal direction (i.e., 1*N pixels) or (N) number of pixels in longitudinal direction (i.e., N*1 pixels).

In one embodiment, when the Hough transform angle (θ) is 0<θ<π/4, 3π/4<θ<π, one block-wise unit may be composed of (N) number of pixels in transversal direction, while, when the Hough transform angle (θ) is π/4<θ<3π/4, one block-wise unit may be composed of (N) number of pixels in longitudinal direction.

The reason for constituting the block-wise unit depending on the size of θ will be explained in detail below.

At S320, the votes of the representative pixels are calculated with respect to the respective blocks as identified at S310. That is, depending on whether the blocks identified at S310 are in transversal or longitudinal direction, A'(x,y) or A"(x,y) of Mathematical Expression 3 or 4 may be expressed as Mathematical Expression 5 or 6 as follows.

$$A'(x, y) = \frac{r}{\cos\theta} = x + y \cdot \tan\theta \qquad \text{[Mathematical Expression 5]}$$

$$A''(x, y) = \frac{r}{\sin\theta} = x \cdot \cot\theta + y \qquad \text{[Mathematical Expression 6]}$$

That is, in one embodiment, when the Hough transform angle (θ) is 0<θ<π/4, 3π/4<θ<π at S320, the votes of the representative pixels may be calculated using Mathematical Expression 5, and the votes of the adjacent representative pixels to the above representative pixels may be calculated by simple addition of distance N between the block-wise units and the previously-calculated tan θ by utilizing Mathematical Expression 3, depending on the relative positions to each other. For example, when the adjacent representative pixels are at a distance N from the representative pixels in the transversal direction, or by 1 in the longitudinal direction, depending on (dx, dy), (N,0) or (0,1) may be substituted to give votes of the adjacent representative pixels.

Likewise, when the Hough transform angle (θ) is π/4<θ<3π/4, the votes of the representative pixels may be calculated using Mathematical Expression 6, and the votes of the adjacent representative pixels to the above representative pixels may be calculated by simple addition of previously-calculated constant cote and the distance N of the block-wise units by utilizing Mathematical Expression 4, depending on the relative positions to the representative pixels.

The method for calculating votes of the representative pixels explained above can advantageously perform the computation partially by accumulation of integers, unlike the method of Mathematical Expression 2 of the conventional Hough transform which computes votes of the adjacent pixels by accumulation of fractions. Accordingly, since it is possible to greatly reduce accumulation register when the method is implemented in hardware level, it is particularly efficient in terms of using hardware resources. The reason for differently applying a method for calculating votes of the representative pixels at S320 depending on Hough transform angle (θ) will be explained below in detail.

At S330, votes of the rest pixels in the respective blocks are calculated, using the votes of the representative pixels acquired at S320. The votes of the rest pixels in the respective blocks may be calculated using Mathematical Expression 7 or 8, depending on whether the blocks identified at S310 are transversal or longitudinal.

$$B'(x+dx,y)=A'(x,y)+dx \qquad \text{[Mathematical Expression 7]}$$

$$B''(x,y+dy)=A''(x,y)+dy \qquad \text{[Mathematical Expression 8]}$$

That is, in one embodiment, when the Hough transform angle (θ) is 0<θ<π/4, 3π/4<θ<π, (N) number of pixels in transversal direction are designated as one block, and the votes of the rest pixels may be calculated by using Mathematical Expression 7 with respect to the votes of the representative pixels as acquired at S320. For example, for the pixel which is three pixels away from the vote of the representative pixel in transversal direction, the vote may be calculated by substituting (dx, dy) with (3, 0), respectively. In the similar manner, when the Hough transform angle (θ) is π/4<θ<3π/4, the votes of the rest pixels may be calculated using Mathematical Expression 8.

As explained above, the aim of voting computation by Hough transform is to measure the frequencies by simply comparing sizes of the votes, and this may utilize Mathematical Expression 7 or 8 which is variation of Mathematical Expression 2. When dividing with the transversal pixel blocks, the pixels within the corresponding blocks are at a distance (dx) from the representative pixel. Accordingly, it is possible to compute the votes using Mathematical Expression 7. When dividing with vertical pixel blocks, the pixels within the corresponding blocks are at a distance (dy) from the representative pixel. Accordingly, the votes can be computed by using Mathematical Expression 8.

The method for computing the votes as explained above provides ways to compute the votes of the respective pixels in the pixel blocks as continuous values at interval of 1. Accordingly, the method can advantageously compute the votes of the all the pixels within the pixel blocks by simply using the vote of the representative pixel. That is, the method requires less overhead compared to the conventional way of vote computation.

At S340, an accumulated frequency per vote is counted, using the votes of the respective pixels as computed at S320 and S330. That is, at S340, the accumulated frequency per (r, θ) space coordinate using votes of the respective pixels. As explained above, since the frequency accumulated in a specific (r,θ) coordinate space with the Hough transform can be considered as the number of pixels existing on the same straight line, it is possible to count the number of pixels existing on the same straight line, at S340.

At S350, the straight line information is detected, based on the information corresponding to the accumulated frequency that is counted at S340 and that exceeds a threshold. To be specific, the operation at S350 determines whether or not the number of pixels existing on the straight line per straight light information exceeds the threshold, selects the straight line information exceeding the threshold, and detects the selected information as the straight light information.

The method for detecting straight line information may update frequencies of all the votes, using the votes of the representative pixels. Accordingly, compared to the conventional Hough transform voting policy, overhead can be greatly reduced, and efficiency greatly increases mainly in view of parallelization and hardware resource use, because it is possible to perform the voting procedure of the votes of the respective pixels within the parallel pixel blocks with an accumulator alone, i.e., without requiring separate vote calculators in hardware implementation.

The apparatus for detecting straight line information according to an embodiment will be explained in detail below.

Figure 4:
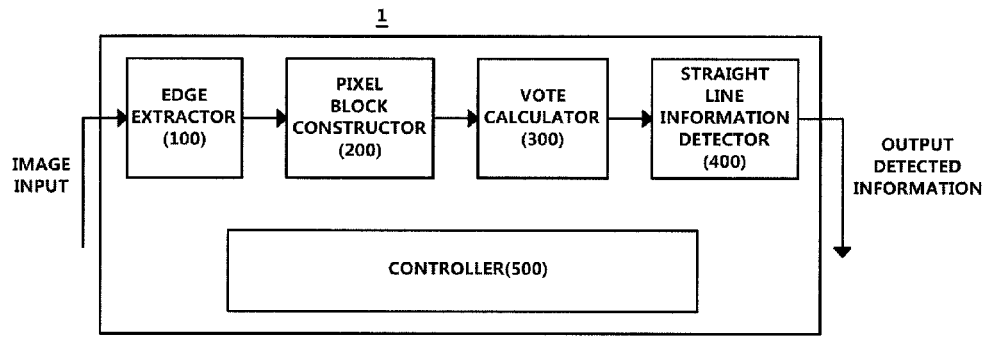
FIG. 4 illustrates an apparatus for detecting a straight line information according to an embodiment.

FIG. 4 illustrates an apparatus for detecting straight line information according to an embodiment.

Referring to FIG. 4, an apparatus 1 for detecting straight line information according to an embodiment may include an edge extractor 100, a pixel block constructor 200, a vote calculator 300 and a straight line information detector 400.

The edge extractor 100 extracts edge information from an incoming image. The edge extractor 100 may apply a variety of algorithms to extract the edge information from the image. In one embodiment, the algorithm of the edge extractor 100 to extract the edge information is not strictly limited.

The pixel block constructor 200 designates the pixels of the image transmitted from the edge extractor 100 into block-wise unit including a predetermined number of pixels. In one embodiment, the pixel block constructor 200 may designate the image into (N) number of pixel block units in horizontal or vertical direction, according to Hough transform angle (θ). The technical constitution explained above may be controlled at a separate controller.

In one embodiment, voting computation for the respective Δθ may be performed independently, in which case the pixel block constructor 200 may designate the pixels of the image into horizontal or vertical pixel block unit according to respective Δθ.

The vote calculator 300 may calculate votes of the representative pixels of the respective blocks as designated by the pixel block constructor 200, and calculate votes of the rest pixels of the respective blocks, using the votes of the representative pixels of the respective blocks.

That is, in one embodiment, the vote calculator 300 calculates votes of the representative pixels by applying Mathematical Expression 3, 5 or Mathematical Expression 4, 6, depending on Hough transform angle (θ). For details of the above method, reference is made to explanation provided above.

The vote calculator 300 calculates votes of the rest pixels of the respective blocks, using the votes of the representative pixels of the respective blocks as calculated in the manner explained above. The vote calculator 300 may calculate the votes of the rest pixels, by applying different mathematical expression depending on the shape of the blocks (or Hough transform angle (θ)) of the blocks as identified by the pixel block constructor 200. That is, in one embodiment, when the Hough transform angle (θ) is $0<\theta<\pi/4$, $3\pi/4<\theta<\pi$, because (N) number of pixels in horizontal direction is designated as one block, the vote calculator 300 may calculate the votes of the rest pixels by utilizing Mathematical Expression 7 with the votes of the representative pixels. For example, for a pixel which is three-pixel away from the vote of the representative pixel in a horizontal direction, it is possible to calculate the vote by substituting (dx, dy) with (3, 0), respectively. Likewise, when the Hough transform angle (θ) is $\pi/4<\theta<3\pi/4$, the vote of the rest pixels may be calculated by utilizing Mathematical Expression 8.

The details of the above technical constitution will be referred to the description provided above for the sake of brevity.

The straight line information detector 400 calculates accumulated frequency of respective votes, using the votes calculated at the vote calculator 300, and detects straight line information based on the information on the accumulated frequency that exceeds a threshold.

First, the straight line information detector 400 counts accumulated frequencies per (r, θ) space coordinates, using the votes per pixels. As mentioned above, since the accumulated frequency in a specific (r,θ) coordinate space by the Hough transform is considered to be the number of pixels present on the same straight line, the straight line information detector 400 counts the number of pixels present on the same straight line.

The straight line information detector 400 determines if the number of pixels present on the straight line per straight line information exceeds a threshold, selects the straight line information exceeding the threshold and detects this as the straight line information.

In one embodiment, the straight line information detecting apparatus 1 may additionally include a controller 500. The controller 500 controls the operation of the modules within the straight line information detecting apparatus 1.

In one embodiment, the controller 500 may control the operation of the pixel block constructor 200. That is, the controller 500 may control the blocks as identified by the pixel block constructor 200 as (N) number of pixel blocks in horizontal or vertical direction, depending on Hough transform angle (θ).

In a preferable embodiment, when the Hough transform angle (θ) is $0<\theta<\pi/4$, $3\pi/4<\theta<\pi$, the controller 500 may cause the pixel block constructor 200 to designate the (N) number of pixels in the horizontal direction as one block unit, while, when the Hough transform angle (θ) is $\pi/4<\theta<3\pi/4$, the controller 500 may cause the pixel block constructor 200 to designate (N) number of pixels in the vertical direction as one block unit.

Further, the controller 500 may control so that value such as Δθ which is applied to Hough transform, is modified depending on information inputted by a user, or the algorithm for the component such as edge extractor 100 is varied.

In the pertinent technical field, a person skilled in the art will be able to understand that the technical constitution that the controller 500 controls the respective modules of the straight line information detecting apparatus 1 can be changed, in so far as the scope of the invention is within the fundamental concept of the present invention.

In one embodiment, there may be a plurality of pixel block constructors 200 and a plurality of vote calculators 300, which may be independently constructed, depending on Δθ applied to voting computation. That is, the pixel block constructors 200 and the vote calculators 300 may be provided in parallel according to Δθ, and the number of vote calculators 300 may be set to same as the number of pixel blocks as designated by the respective pixel block constructor 200.

A person skilled in the art will be able to understand that the technical constitution explained above can be modified in so far as the scope of the invention is within the fundamental concept of the present invention.

Hereinbelow, the performance of the straight line information detecting method according to an embodiment is compared with the conventional technologies and analyzed.

The detection performance of a hardware structure implementing the straight line information detection method proposed according to an embodiment, is compared with that of practically-implemented thesis by Z. H. Chen et al. as the related art, which is known to have good detection performance and high hourly throughput and computational speed (Resource efficient FPGA architecture and implementation of hough transform, Z. H. Chen and two others, IEEE). For the purpose of comparing the detection performance, the structure of the related art was prepared, which was HDL-based hardware structure was modeled, and the maximum error of vote was measured while varying fixed fractional bit under Quartus II Version 9.1 with SP2, EP2S180F1508C3 environment. Accordingly, Table 1 below lists comparison of error rate of the votes according to fixed fractional bit variation between the related art and the proposed hardware structure implementing the straight line information detection method according to the embodiment.

TABLE 1

| Number of Fractional Bits | Maximum Error of Vote ([15]) | Maximum Error of Vote (Proposed) |
| --- | --- | --- |
| 10 | 0.375 | 0.375 |
| 11 | 0.188 | 0.188 |
| 12 | 0.094 | 0.094 |
| 13 | 0.047 | 0.047 |

Referring to Table 1, the proposed hardware structure implementing the straight line information detection method according to an embodiment has little difference from the prior research in its detection performance. The above result is attributable to the fact a new policy is proposed in a way of changing the existing algorithm only in form, instead of applying approximation or simplification. Therefore, the computed values have almost no loss, and deterioration of the detection performance is prevented.

TABLE 2

| N | ALUTs | ALUTs/N | Maximum Frequency |
| --- | --- | --- | --- |
| 2 | 57 | 28.50 | 449 |
| 4 | 79 | 19.75 | 449 |
| 8 | 122 | 15.25 | 449 |
| 16 | 208 | 13.00 | 425 |

Table 2 shows the result of comparing amount of using hardware resources at the modules for calculating votes, while increasing the size (N) of the parallel pixel blocks. Compared to the overhead for computing votes of the representative pixels, the overhead for generating votes of the neighborhood pixels within the parallel pixel block is relatively small. Accordingly, because the use of resource (ALUTs/N) for computing one vote degreases as the size of N increases, it indicates that the parallelization is efficiently performed. This is attributable to the fact that, compared to the related art that requires adder, AND gate and decoder for the purpose of parallelization, the hardware structure implementing the straight line information detection method according to an embodiment requires only an adder (and less amount of adders) for the purpose of parallelization, thus saving many components.

Next, the hardware structure according to an embodiment is compared with the other prior researches to verify superiority in the hourly throughput and use of hardware resources.

TABLE 3

| Performance Index | Pipelined CORDIC [12] | DA [13] | Chern's Method [14] | Zhong-Ho's Method [15] | Proposed |
| --- | --- | --- | --- | --- | --- |
| Error | 0.177 | 0.125 | 0.125 | 0.094 | 0.094 |
| ALUTs | 520 | 13 | 55 | 416 | 208 |
| Throughput per Cycle | 2 | 1/9 | 1 | 16 | 16 |
| Maximum Frequency (MHz) | 384 | 500 | 387 | 333 | 425 |
| Throughput (K pixels * angles) | 768 | 56 | 387 | 5328 | 6800 |
| Throughput/ ALUTs | 1.477 | 4.274 | 7.036 | 12.808 | 32.692 |

Referring to Table 3, the proposed hardware structure implementing the straight line information detection method according to an embodiment and hardware of the prior researches for vote computation are compared in view of detection error rate ('Error') concerning the hardware part that performs vote computation; use of hardware resources ('ALUTs'); throughput per clock cycle ('Throughput per Cycle'); maximum operating frequency ('Maximum Frequency'); hourly throughput ('Throughput'), and throughput compared to hardware resource use ('Throughput/ALUTs'). In order to maintain objectivity in comparing with the prior researches of relatively good detection error rates and hourly throughput compared to hardware resource use, the throughput per clock cycle of the proposed hardware structure according to an embodiment was designed same as the prior technologies (i.e., 16). The hardware structure according to an embodiment has the identical accumulator structure as the related art that utilizes correlativity between the pixels and thus has the same detection error rate. In terms of hardware cost, compared to the related hardware structure which requires that two registers all have to include fraction part for the purpose of accumulation, the structure according to an embodiment can replace one register with a register that has integer part only. Additionally, the overhead is relatively low compared to the increased throughput (see Table 2), and the need for hardware resource use for the same throughput per cycle is only a half when compared with the related art. Further, while the related art requires for the vote computation of the pixels within parallel pixel block that addition including fraction part be performed and followed by additional adder and decoder to obtain integer part only, the proposed hardware structure according to an embodiment requires only one time of integer part addition to compute the votes of the pixels within the parallel pixel blocks. Therefore, the critical path is improved than the related technology, and superior maximum operating frequency is provided.

Accordingly, the proposed hardware structure implementing the straight line information detection method according to the present invention satisfies high operating frequency, and provides high throughput with relatively less hardware resources, which means the hardware structure according to an embodiment can provide highest hourly throughput per hardware resource use, compared to the prior researches.

As explained above, the straight line information detecting apparatus and method according to an embodiment designates pixel information of an image into pixel block-wise units each including a plurality of pixels, calculate votes of representative pixels within the respective pixel blocks, and calculate votes of the rest pixels by adding a predetermined integer to the votes of the representative pixels, thereby reducing overhead necessary for the computation.

Accordingly, by applying an integer part adding manner instead of a related manner of adding fraction part, less number of registers is required.

Further, since it is possible to readily calculate the votes of the rest pixels simply by adding integer to the votes of the representative pixels, use of resources can be optimized in parallelizing the corresponding computation.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. A method for detecting straight line information, comprising steps of:
   (A) inputting an image with extracted edge;
   (B) designating pixels of the image into block-wise units each comprising a predetermined number of pixels;
   (C) calculating votes of representative pixels per designated block;
   (D) calculating votes of rest pixels per block, using the votes of the representative pixels per block;
   (E) counting accumulated frequencies per vote, using the votes calculated at steps (C) and (D); and
   (F) detecting straight line information based on the accumulated frequency information that exceeds a threshold,
   wherein said calculating votes of rest pixels per block calculates said votes of rest pixels per block by reducing a fraction term using a trigonometrical function according to a relative coordinate of rest pixels with respect to the representative pixels.

2. The method of claim 1, wherein said designating designates (N) number of pixels in a horizontal or vertical direction into one block-wise unit, according to Hough transform angle ($\theta$).

3. The method of claim 2, wherein said designating designates (N) number of pixels into one block-wise unit, when the Hough transform angle ($\theta$) is $0<\theta<\pi/4$, $3\pi/4<\theta<\pi$, or designates (N) number of pixels in vertical direction as one block-wise unit, when the Hough transform angle ($\theta$) is $\pi/4<\theta<3\pi/4$.

4. The method of claim 2, wherein said calculating votes of representative pixels calculates the votes of the representative pixels per block by adding a predetermined value to the votes of the representative pixels per neighborhood block.

5. The method of claim 4, wherein, when the Hough transform angle ($\theta$) is $0<\theta<\pi/4$, $3\pi/4<\theta<\pi$, the predetermined value is N with respect to neighborhood representative pixels in horizontal direction to the representative pixels, or the predetermined value is $\tan\theta$ with respect to the neighborhood representative pixels in vertical direction, or
   when the Hough transform angle ($\theta$) is $\pi/4<\theta<3\pi/4$, the predetermined value is $\cot\theta$ with respect to neighborhood representative pixels in horizontal direction to the representative pixels, or the predetermined value is N with respect to neighborhood representative pixels in vertical direction.

6. The method of claim 1, wherein said calculating votes of rest pixels calculates votes of the rest pixels per block by adding a predetermined value to the votes of the representative pixels per block.

7. The method of claim 6, wherein, when the representative pixels are M pixels away from the rest pixels, the predetermined value is M.

8. An apparatus for detecting straight line information, comprising:
   an edge extractor configured to extract edge information from an incoming image;
   a pixel block constructor configured to designate pixels of the image received from the edge extractor into block-wise units each comprising a predetermined number of pixels;
   a vote calculator configured to calculate votes of representative pixels per block as designated by the pixel block constructor and calculate votes of rest pixels per block using the votes of representative pixels per block; and
   a straight line information detector configured to calculate accumulated frequencies per vote by using the votes calculated at the vote calculator and detect straight line information based on the accumulated frequency information that exceeds a threshold,
   wherein the vote calculator is configured to calculate votes of rest pixels per block using a Mathematical Expression which reduces a fraction term using a trigonometrical function according to a relative coordinate of rest pixels with respect to the representative pixel.

9. The apparatus of claim 8, further comprising a controller configured to control so that the blocks designated at the pixel block constructor are (N) number of pixel blocks in horizontal or vertical direction, depending on Hough transform angle ($\theta$).

10. The apparatus of claim 9, wherein the controller controls the pixel block constructor to designate (N) number of pixels into one block-wise unit, when the Hough transform angle ($\theta$) is $0<\theta<\pi/4$, $3\pi/4<\theta<\pi$, or
    to designate (N) number of pixels in vertical direction as one block-wise unit, when the Hough transform angle ($\theta$) is $\pi/4<\theta<3\pi/4$.

11. The apparatus of claim 9, wherein the vote calculator calculates the votes of the representative pixels per block by adding a predetermined value to the votes of the representative pixels per neighborhood block.

12. The apparatus of claim 11, wherein, when the Hough transform angle ($\theta$) is $0<\theta<\pi/4$, $3\pi/4<\theta<\pi$, the predetermined value is N with respect to neighborhood representative pixels in horizontal direction to the representative pixels, or the predetermined value is $\tan\theta$ with respect to the neighborhood representative pixels in vertical direction, or
    when the Hough transform angle ($\theta$) is $\pi/4<\theta<3\pi/4$, the predetermined value is $\cot\theta$ with respect to neighborhood representative pixels in horizontal direction to the representative pixels, or the predetermined value is N with respect to neighborhood representative pixels in vertical direction.

13. The apparatus of claim 8, wherein the vote calculator calculates votes of the rest pixels per block by adding a predetermined value to the votes of the representative pixels per block.

14. The apparatus of claim 13, wherein, when the representative pixels are M pixels distanced away from the rest pixels, the vote calculator applies M as the predetermined value.

15. The method of claim 1, wherein the fraction term reduction can be acquired with Mathematical Expression 3 or 4 as follows:

$$B'(x+dx, y+dy) = A'(x,y) + dx + dy \cdot \tan \theta \qquad \text{Mathematical Expression (3)}$$

$$B''(x+dx, y+dy) = A''(x,y) + dx \cdot \cot \theta + dy \qquad \text{Mathematical Expression (4)}$$

wherein B' and B" are a voting computation of the rest pixels, A' and A" are a voting computation of the representative pixel, and $\theta$ is Hough transform angle.

16. The apparatus of claim 8, wherein the fraction term reduction can be acquired with Mathematical Expression 3 or 4 as follows:

$$B'(x+dx, y+dy) = A'(x,y) + dx + dy \cdot \tan \theta \qquad \text{Mathematical Expression (3)}$$

$$B''(x+dx, y+dy) = A''(x,y) + dx \cdot \cot \theta + dy \qquad \text{Mathematical Expression (4)}$$

wherein, B' and B" are a voting computation of the rest pixels, A' and A" are a voting computation of the representative pixel, and $\theta$ is Hough transform angle.

\* \* \* \* \*